June 23, 1931.  A. J. GRANBERG  1,811,789
FLUID METER
Filed Dec. 20, 1927   3 Sheets-Sheet 1

INVENTOR.
Albert J. Granberg.
BY
Townsend, Loftus & Abbett
ATTORNEYS.

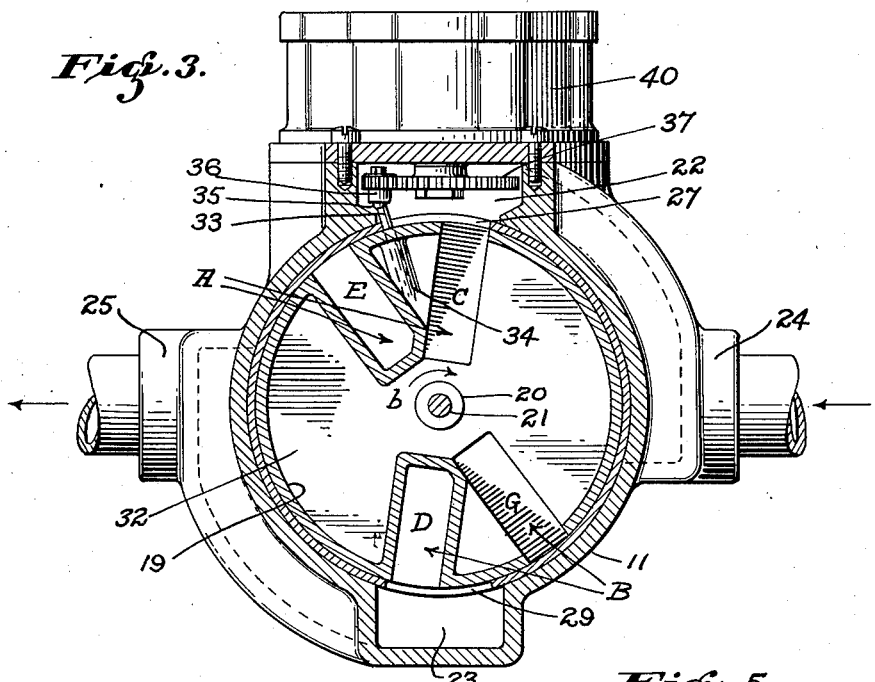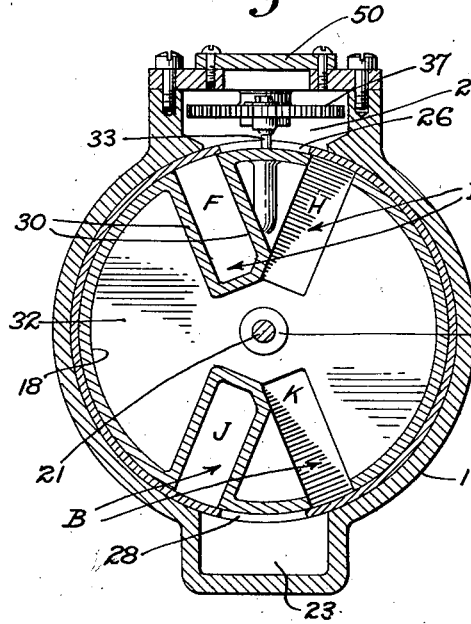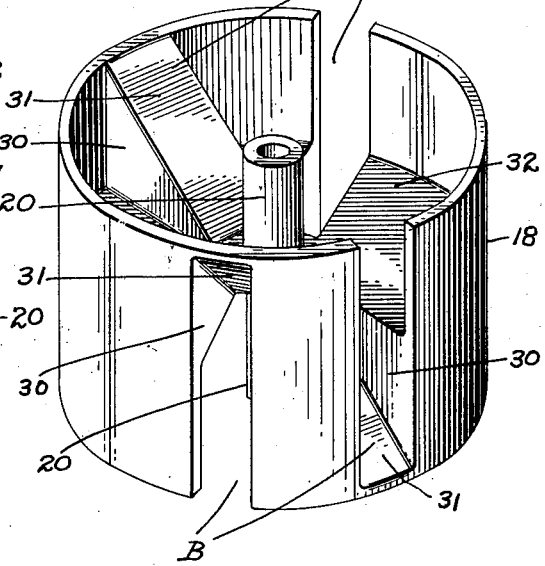

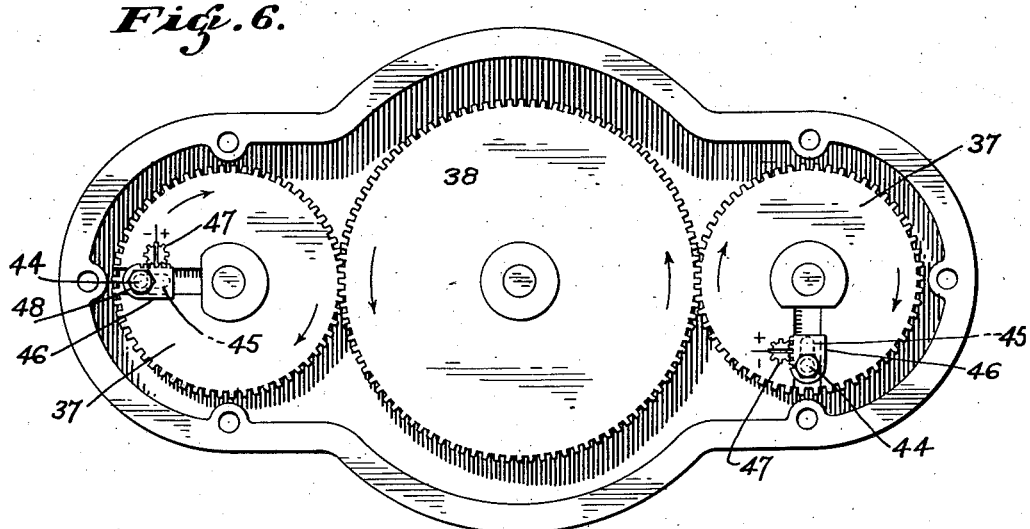
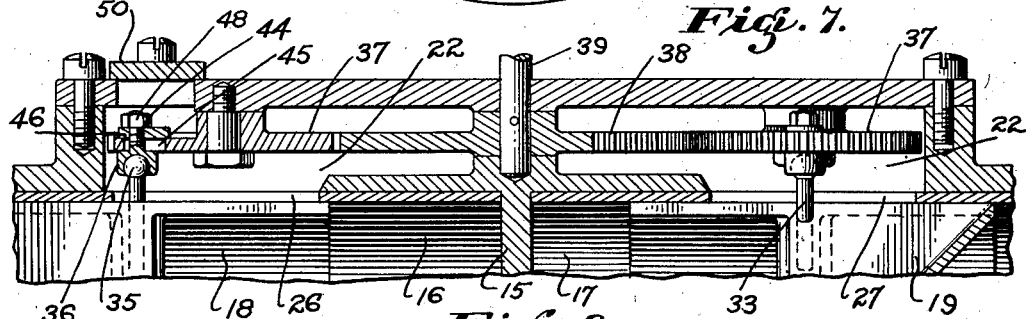
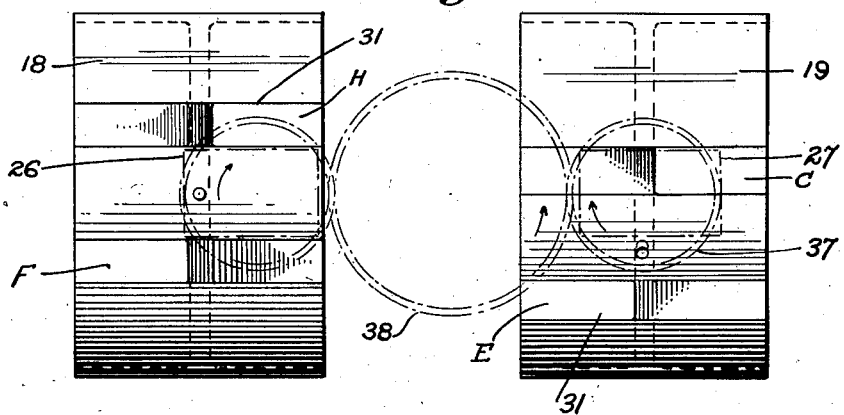

Patented June 23, 1931

1,811,789

UNITED STATES PATENT OFFICE

ALBERT J. GRANBERG, OF BERKELEY, CALIFORNIA, ASSIGNOR TO RALPH N. BRODIE COMPANY, OF OAKLAND, CALIFORNIA, A CORPORATION OF CALIFORNIA

FLUID METER

Application filed December 20, 1927. Serial No. 241,309.

This invention relates to meters and particularly pertains to fluid meters of the displacement type for measuring and indicating the volume of fluids.

It is the principal object of the present invention to generally improve the construction and operation of meters of the character referred to by providing a meter employing but a minimum of operating parts whereby to reduce wear and friction and insure accuracy and efficiency, which meter is capable of permitting fluid to flow therethrough in an even constant stream and capable of measuring the fluid as it passes therethrough and indicate the volume thereof; the said meter is so constructed that gritty or foreign substances which may be present in the fluid will be discharged through the meter without the wearing surfaces of the meter being exposed to the abrasive action of such substances.

The present invention contemplates the provision of a metering casing formed with two metering cylinders, each of which being fitted with a reciprocable and rotatable piston. Cooperating ports are formed in the pistons and cylinders to enable fluid to be admitted to one end of the cylinders and simultaneously discharge from the opposite ends thereof. The pistons are reciprocated by the fluid and are caused to oscillate during reciprocation to so register the ports that the fluid is delivered alternately to opposite ends of the metering cylinders and consequently alternately discharge from the other ends thereof. The pistons are so connected that they operate synchronously and act through an intermediate mechanism to operate a counting device to indicate and register the volume of the fluid discharged through the meter upon the operation thereof.

One form which the invention may assume is exemplified in the following description and illustrated by way of example in the accompanying drawings, in which:

Fig. 3 is a transverse sectional view taken on line III—III of Fig. 2.

Fig. 4 is a transverse sectional view taken on line IV—IV of Fig. 2.

Fig. 5 is a perspective view of one of the pistons employed in the meter.

Fig. 6 is a plan view of the intake chamber with its cover plate removed.

Fig. 7 is an enlarged fragmentary view in longitudinal section through the intake chamber of the meter.

Fig. 8 is a diagrammatic view showing the pistons and the ports and their relative positioning with relation to the counter driving gears.

Figure 1:
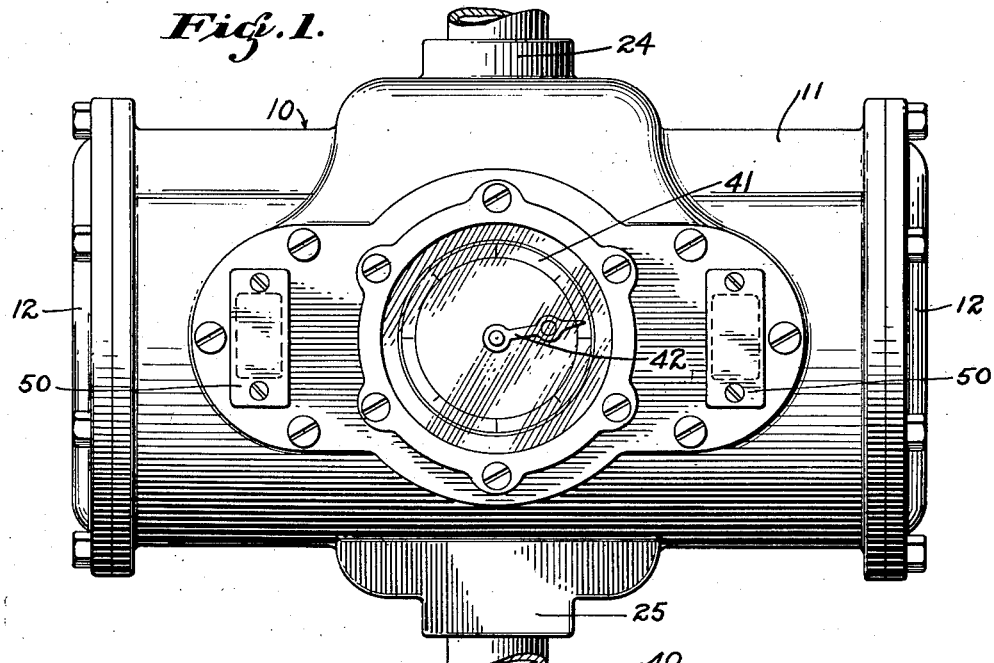
Fig. 1 is a plan view of a meter embodying the preferred form of the invention.

Referring more particularly to the accompanying drawings, 10 indicates a fluid meter capable of measuring and indicating the volume of fluid passed through the meter. The meter comprises a cylinder 11 having its ends enclosed by circular head members 12. To connect these head members to the cylinder, flanges 14 are formed at the ends of the latter and the head members are bolted or otherwise secured to the flanges.

The bore of the cylinder is transversely and centrally divided by a partition wall 15 into two metering cylinders 16 and 17. These cylinders are preferably lined with a non-corrodible material and are bored to receive pistons 18 and 19.

Each of these pistons 18 and 19 are formed with a coaxial guide 20 reciprocably and rotatably mounted on a shaft 21. These shafts 21 are arranged coaxially of the metering cylinders and are secured at their ends in the head members 12 and partition wall 15. The pistons 18 and 19 are just slightly less in diameter than the diameter of the bore of the cylinders 16 and 17, so that a running fit between the surfaces of the pistons and the bore of the chambers will result. The mounting of the pistons as described is such as to permit them to both revolve and reciprocate in their respective cylinders with a minimum of resistance.

It is intended that the entrance of fluid into the metering cylinders cause the pistons to reciprocate. This movement of the pistons is transmitted to an indicating device operatively connected to the pistons through intermediate mechanism. The indicating device is adapted to register or indicate the volume of fluid displaced by the pistons during their operative periods.

Figure 2:
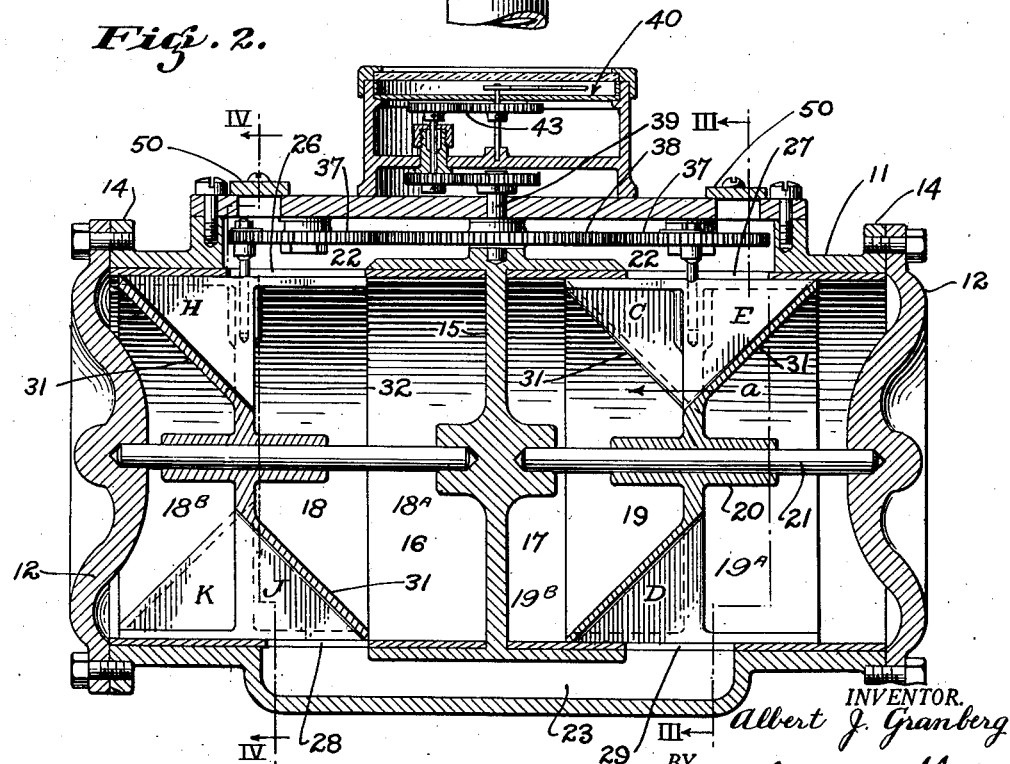
Fig. 2 is a central vertical section through the meter.

Reference being had to Figs. 2 and 3, it will be seen that above the metering cylinders the casing is formed with an intake chamber 22, and below the metering chambers the casing is formed with an exhaust or discharge chamber 23. The intake chamber communicates with an inlet port 24 while the discharge chamber connects with an outlet port 25. These ports 24 and 25 are tapped and in alignment so that the meter may be interposed in a pipe line conducting the fluid to be measured.

The casing wall at the top of the cylinder separating the intake chamber 22 from the metering cylinders 16 and 17 is formed with two rectangular intake ports 26 and 27. The port 26 is formed substantially centrally over the metering cylinder 16 and the port 27 is similarly positioned over the metering cylinder 17. At the bottom of the casing, the wall interposed between the metering cylinders and the discharge chamber 23 is formed with two rectangular discharge ports 28 and 29. The port 28 is located at the bottom of the metering cylinder 16 while the other port 29 is positioned at the bottom of the cylinder 17. The ports 26 and 27 and the ports 28 and 29 are all arranged at the vertical center of the respective cylinders as shown in Figs. 3 and 4.

The pistons 18 and 19 are formed with what I prefer to term ports which are adapted to register with the intake and discharge ports 26, 27, 28 and 29. Reference being had to Figs. 2, 4 and 5 it will be seen that each port of the pistons is formed by cutting a longitudinal section out of the peripheral wall of the piston. The width of this cut-away portion is substantially one-half the width of the ports 26, 27, 28 and 29. Radial side walls 30 extend inwardly in parallelism toward the center of the piston from the sides of the opening in the peripheral wall of the piston. Within the piston these side walls are connected together by an obliquely arranged bottom wall 31 which extends from the outer periphery of the piston to a transverse partition wall 32 centrally and transversely dividing the interior of the piston. This wall 32 is slotted radially in alignment with the port formed by the opening in the piston wall, the side walls 30 and the bottom wall 31, so that fluid entering the port will be conducted to a metering chamber at one end of the piston and metering cylinder. It is apparent that the partition 32 in each piston divides each metering cylinder into two metering chambers.

From the drawings it will be seen that the obliquely arranged bottom wall 31 of each piston port extends from one end of the piston at its outer periphery to the central wall 32 at a point just short of the axial center of the piston.

Each piston is formed with a pair of intake ports A and a pair of discharge pockets B. The ports of each pair are oppositely disposed; that is, one port of each pair extends inwardly from the outer end of the piston while the other port extends oppositely thereto from the inner end of the piston. The ports of the different pairs A and B are also arranged relatively opposite and upon opposite sides of the transverse axis of the piston. The spacing between the ports of each pair is slightly greater than the transverse dimension of either of the ports 26 to 29 inclusive in the casing, so that under certain conditions fluid may not pass through the piston from the intake chamber into the metering cylinder or from the metering chamber to the discharge cylinder.

It should be stated here that both pistons 18 and 19 are the same in construction but are arranged in the metering cylinders relatively opposite.

As before stated, the pistons are reciprocably mounted in the metering cylinders and they are adapted to be reciprocated therein by the pressure of the fluid entering the intake chamber 22. To describe this operation, the operation of one piston will be set forth in order that the action of the pistons may be understood.

Reference being had to Figs. 2 and 3, assuming that the piston at the right of the figure is in the position illustrated, it will be noted that the port C is in register with the intake port 27. The fluid will pass through the port C in the piston and enter metering chamber 19a at the outer end of piston 19 and displace the same, moving it in the direction of the arrow a. Simultaneously with this the fluid in metering chamber 19b at the opposite end of the piston 19 may discharge through the discharge port 29 through the piston port D (see Fig. 3) of the piston which will be in alignment with the discharge port 29 when the port C is in alignment with the intake port 27.

As the piston is moved inwardly in the direction of the arrow a, it will be caused to rotate. This is accomplished by fitting the piston with a radial pin 33 which projects radially from the peripheral surface of the piston at a point midway between the two ports at the top of the piston. The inner end of this pin 33 is reciprocably mounted in a socket 34 formed radially within the piston. The outer end of the pin 33 is formed with a ball 35 engaging a socket 36 secured at an eccentric point on a spur gear 37. This spur gear is rotatably mounted within the intake chamber 22 above the piston. The ball and socket joint 35 and 36 forms a universal connection between the pin 33 and the gear 37. Therefore as the piston moves in the direction of the arrow $a$, the gear 37 will be revolved. As the outer end of the pin 33 will move in a circle about the transverse axis of the piston, the piston will be oscillated an amount regulated by the length of the stroke of the outer end of the pin.

In the position that the piston is shown in Figs. 2 and 3, the outer end of the pin 33 is in its outermost position and as the piston moves inwardly, the pin will approach the center of the piston and will consequently revolve the piston in the direction of the arrow $b$ shown in Fig. 3; thus moving the port C out of register with the port 27 and the port D out of register with port 29. When the pin 33 reaches dead center, the port C will be out of register entirely with the port 27 and the flow of fluid into the metering chamber through the port C will cease and likewise piston port D will be out of register with discharge port 29. At this point, the piston will be at the end of its stroke. Also the port E will be in a position just ready to commence registering with the port 27 and the port G will be positioned to commence registering with port 29. The piston 19, however, will have moved the pin 33 to dead center and will require the assistance of the other piston to move it over dead center. This is the reason for placing the pistons at ninety degrees apart.

The gears 37 of both pistons mesh with a master gear 38 mounted on a shaft 39 journalled in the walls of the cylinder, so as to dispose the gear 38 within the intake chamber 22. As the two gears 37 mesh with the same master gear, it is necessary that the two pistons operate synchronously.

When the piston 19 reaches the end of its inward stroke, the piston 18 will be at the center of its inward stroke. During the last half of its inward stroke the piston 19 has carried the piston 18 from a position at dead center, as shown in Figs. 4 and 6, to a position where its port F registers with the intake port 26 and its port K registering with discharge port 28. This port is so disposed that the fluid under pressure discharging through the port 26 will pass through the port F and enter metering chamber 18$b$ of the metering cylinder 16 and move the piston inwardly toward the center of the cylinder. This inward movement of the piston 18 after the piston 19 has reached dead center will drive the master gear 38 to revolve the gear 37 of the piston 19. Such revolution of the gear 37 of the piston 19 will throw the point of connection between the piston 19 and its gear beyond center and at the same time will move the port E of piston 19 into register with the port 27 and the port G into registry with port 29. This port E, being oppositely disposed to port C, will cause the pressure of the fluid to move the piston outwardly.

After the piston has moved sufficiently to revolve the gear 37 ninety degrees from dead center, the connection between the piston 18 and its gear 37 will have reached dead center and the piston 19 through its gear 37 during the latter half of its outward stroke will move said connection beyond dead center so as to again place the piston 18 in operation.

It is thus obvious that the two pistons operate synchronously and that both are actuated by the fluid under pressure to perform their functions. When one piston reaches the end of its stroke, the chamber at the inner end of the piston will be filled with fluid, and as the piston moves inwardly this fluid will be displaced and caused to discharge into the discharge chamber 22 and thence through the port 25.

As the volume of displacement can be measured, the amount displaced during the strokes of the pistons can be determined, and the volume displaced during each complete revolution of the master gear 38 can also be determined due to the fact that this master gear is driven by the gears 37, which in turn are operated by the pistons 18 and 19.

Thus, I utilize this master gear to drive an indicating mechanism 40. This indicating mechanism includes the usual calibrated scale 41 with which a pointer 42 cooperates. This pointer 42 is driven by the master gear 38 through an intermediate train of gears 43.

For purposes of adjustment, the point of connection between the pins 33 and the gears 37 may be adjusted relative to the center of the gears 37. This is accomplished by fitting the socket member 36 with a stud 44 which extends through a slot 45 in the gear 37. A member 46 is arranged on the stud and is held from rotation on the gear 37. At one side this member 46 is formed with rack teeth in mesh with a small pinion 47. This pinion 47 is formed with a screw driver slot so that it may be revolved. A nut 48 is fitted on the stud 44 to firmly clamp the member 46 and the socket member 36 to the gear 37. By loosening this nut 48 and revolving the pinion 47, the socket member may be adjusted radially with respect to the center of the gear 37, thus, increasing or decreasing the stroke. After the stroke has been properly adjusted, the nut 48 is tightened, firmly clamping the socket 36 to the gear 37 and preventing relative movement therebetween.

In operation of the device, the meter is interposed in a pipe line wherethrough fluid is being forced in the direction of the arrows in Fig. 3. The fluid entering the intake port 24 will enter the intake chamber 22 and seek outlet through the metering cylinders. Assuming that the pistons 18 and 19 are in the positions shown in Figs. 2 to 4 inclusive, the piston 18 will be on dead center while the fluid discharging through port 27 will be moving the piston 19 in the direction of arrow a in Fig. 2. As this latter piston continues its inward movement, it will through the medium of the gears 37 and 38 move the piston 18 beyond dead center and place the port F of the latter in register with the port 26 and piston port K in register with port 28. This port is so arranged that the fluid from the chamber 22 will cause the piston 18 to move inwardly of the metering cylinder or in the opposite direction to the piston 19 until the latter reaches dead center or the end of its inward stroke.

At this point the piston 18 will have completed one-half of its inner stroke and during the second half of its inner stroke will move the piston 19 beyond dead center through the medium of the gears 37 and 38 and place the port E in register with the port 27 and port G in register with port 29.

The fluid under pressure passing through the port 27 will pass through port E and enter metering chamber 19b forcing the piston 19 outwardly. At the same time the fluid in metering chamber 19a will pass through the port G and discharge through the port 29.

It is obvious that the metering chamber at the outer end of the piston will be filled with fluid during the previous stroke of the piston and this fluid may discharge through the port G, which will be in register with the port 29 when the port E registers with the port 27. Thus, as the piston 19 moves in its outer stroke the fluid of the metering chamber at the outer end of the piston will be displaced. As the piston 19 approaches the outermost point of its stroke, it will be slowly revolved due to its connection with the gear 37 and will gradually remove the ports E and G from register with the ports 27 and 29. When the piston reaches the outermost point of its stroke, the ports E and G will be completely out of register with the ports 27 and 29, and the pin 33 will be on dead center.

At this point the piston 18 will have completed one-half of its outer stroke and its port H will be in register with the port 26 and its port J will be in register with the port 28. The fluid passing through the port H and entering the metering chamber 18a moves the piston outwardly and revolving its gear 37. This gear 37 through the medium of the master gear 38 will revolve the gear 37 of the piston 19, causing the piston to move inwardly and at the same time throw its ports C and D into register with the ports 27 and 29. When such registration is effected, the fluid pressure will again act on the piston 19 to move the same inwardly so that during the latter half of its inner stroke it can assist in again placing the piston 18 in operation as previously described.

As the pistons reciprocate they will revolve the master gear 38 through the medium of the gear 37 and this master gear will operate the counter mechanism 40. This mechanism is so designed that it will register or indicate the volumes of fluid displaced by the pistons 18 and 19.

It is desired to point out that the fluid will flow through the meter in an even constant stream due to the fact that there is always an intake opening, equal to the area of one of the piston ports, in one of the cylinders. I prefer to term this, for purposes of explanation, a 100% valve opening. That is to say, when the port opening on the piston 19 is 25% open the port opening on the piston 18 will be 75% open, the open area of both equalling 100%. Likewise, when the port opening on the piston 19 or vice versa is 50% or half open, the port opening of piston 18 is likewise half open. Thus at all times the port opening for the fluid to pass through the meter is of the same area and similarly the discharge opening remains constant in area, so that the fluid may flow through the meter in an even constant stream.

From Fig. 2, it will be seen that the pistons are supported by their guides 20 on the central rods 21, and thus the wear between the peripheral walls of the piston and the walls of the cylinder will be equal and minimized.

If it is desired to adjust the meter, cover plates 50 over the intake chamber 22 may be removed to expose the connections between the pins 33 and the gears 37 (see Figs. 6 and 7). The nuts 48 may then be loosened and the pinions 47 revolved to move the sockets 36 relative to the center of the gears 37. After the proper adjustment has been obtained, the nuts 48 are again tightened and the cover plates 50 replaced.

It is obvious that by changing the strokes of the pins 33, the displacement of the pistons will be correspondingly changed and thus the meter may be adjusted to a very fine degree, so that it will accurately indicate the fluid displaced by the pistons by tallying the strokes of the pistons. For example, should each stroke of the piston equal a displacement of one gallon, the stroke of the piston will be translated by the indicating mechanism so that the latter will indicate one gallon of fluid. Should it be found that the displacement of the piston be more or less than the volume indicated by the indicator mechanism, the stroke of the crank pin 33 may be changed so that the volume displaced will be exactly the same as that indicated.

Should any gritty or foreign substance be present in the fluid being measured, the same will flow directly through the meter and will not accumulate on the cylinder walls, nor will it have any incentive to lodge between the piston walls and the walls of cylinders as it may freely pass through the discharge ports 28 and 29 under displacement of the fluid by the pistons.

From the foregoing it is obvious that I have provided a meter of very simple construction which will be accurate in operation and which is constructed of a minimum of moving parts.

While I have shown the preferred form of my invention, it is to be understood that various changes may be made in its construction by those skilled in the art, without departing from the spirit of the invention, as defined in the appended claims.

Having thus described my invention, what I claim and desire to secure by Letters Patent is:

1. A meter comprising a casing having an intake and an exhaust chamber, a pair of metering cylinders arranged in axial alignment, a piston in each metering cylinder, said pistons being adapted to be reciprocated by fluid from the intake chamber, said metering cylinders and said pistons having cooperating ports to admit fluid to one end of each chamber and to permit fluid at the opposite end of each chamber to be displaced by the pistons during each stroke thereof, an indicating device and mechanism connected with the pistons and with the indicating device and actuated by the reciprocation of the pistons to impart rotary movement to the pistons and to operate the indicating device.

2. A meter comprising a casing including an intake chamber and a discharge chamber, a pair of metering cylinders arranged in axial alignment, each metering cylinder having an intake and a discharge port, a piston in each cylinder, each piston having two pairs of ports, each pair comprising an intake and a discharge port adapted to register with the intake and discharge ports of the metering cylinder in which the piston is disposed, means synchronizing the operation of the pistons and imparting rotary movement to each piston while it is being reciprocated by the fluid to place its pairs of ports alternately in register with the ports of its metering cylinder at the ends of the piston strokes to admit fluid to one end of each metering cylinder and to permit the discharge of fluid from the opposite end thereof during each stroke of the pistons, and means operated by the pistons for indicating the combined volumes of fluid displaced by the pistons.

3. A meter comprising a casing including an intake chamber and a discharge chamber, a pair of metering cylinders arranged in axial alignment, each metering cylinder having an intake and a discharge port, a piston in each cylinder, each piston having two pairs of ports, each pair comprising an intake and a discharge port adapted to register with the intake and discharge ports of the metering cylinder in which the piston is disposed, means for imparting rotary movement to each piston while it is being reciprocated by the fluid to place its pairs of ports alternately in register with the ports of its metering cylinder at the ends of the piston strokes to admit fluid to one end of each metering cylinder and to permit the discharge of fluid from the opposite end thereof during each stroke of the pistons, the said actuating means for each piston being operatively associated whereby the pistons will operate in synchronism and in overlapping cycles, and indicating means operated by the pistons to indicate the volume of fluid displaced by the pistons.

4. A meter comprising a casing having an intake and an exhaust chamber, a pair of metering cylinders arranged in axial alignment, a piston in each metering cylinder, said pistons being adapted to be reciprocated by fluid from the intake chamber, said metering cylinders and said pistons having cooperating ports to admit fluid to one end of each chamber and to permit fluid at the opposite end of each chamber to be displaced by the pistons during each stroke thereof, means for operatively connecting the pistons and actuated by the reciprocation of the pistons for imparting rotary movement to the same for synchronizing the registration of the ports, and indicating means adapted to indicate the volume of fluid displaced by both pistons.

5. A meter comprising a casing having an intake and an exhaust chamber, a pair of metering cylinders arranged in axial alignment, a piston in each metering cylinder, said pistons being adapted to be reciprocated by fluid from the intake chamber, said metering cylinders and said pistons having cooperating ports to admit fluid to one end of each cylinder and to permit fluid at the opposite end of each cylinder to be displaced by the pistons during each stroke thereof, means operatively connecting the pistons together whereby they will operate in synchronism and in overlapping cycles, and a single indicating means operatively connected to the means for operatively connecting pistons to register the combined volumes of fluid displaced by the pistons, said means being actuated by the reciprocation of the pistons 6. A meter comprising a pair of metering cylinders, a piston reciprocably mounted in each cylinder and adapted to be reciprocated by fluid delivered to the metering cylinders, the latter being provided with intake and discharge ports, each piston being formed with ports to cooperate with the ports of the metering cylinder in which the piston is disposed, crank means for each piston adapted to revolve the piston during the reciprocation thereof, means operatively connecting the crank means of the pistons to synchronize the operations of the pistons, said revolving of the pistons controlling the registration of said ports whereby to admit fluid to one end of the metering cylinders and to permit the fluid at the opposite end of the cylinders to be displaced by the pistons during each stroke thereof, and means for tallying the combined strokes of the pistons to indicate the volume of fluid displaced thereby.

7. A meter comprising a pair of metering cylinders, a piston reciprocably mounted in each cylinder and adapted to be reciprocated by fluid delivered to the metering cylinders, the latter being provided with intake and discharge ports, each piston being formed with ports to cooperate with the ports of the metering cylinder in which the piston is disposed, crank means for each piston adapted to revolve the piston during the reciprocation thereof, said revolving of the pistons controlling the registration of said ports whereby to admit fluid to one end of the metering cylinders and to permit the fluid at the opposite end of the cylinders to be displaced by the pistons during each stroke thereof, means operatively connecting the crank means of the pistons together whereby the pistons will operate in synchronism and in overlapping cycles, and indicating means driven by the pistons to indicate the fluid displaced thereby.

8. A meter comprising a casing having an intake chamber and a discharge chamber, a pair of metering cylinders, a piston in each metering cylinder, each cylinder being formed with an intake and a discharge port, each piston having two pairs of ports, each pair comprising an intake and a discharge port adapted to register with the ports of the metering cylinder in which the piston is disposed, said pistons being adapted to be reciprocated by fluid from the intake chamber, a revoluble member for each piston revolving about an axis arranged at right angles to the axis of the pistons, means for operatively connecting the revoluble members to operate in synchronism including a connection between each piston and the adjacent revoluble member at an eccentric point on the latter whereby reciprocation of the pistons will revolve said revoluble members, said revoluble members being operatively connected to operate in synchronism, the connection between the pistons and the revoluble members being relatively disposed ninety degrees apart whereby the pistons will operate in overlapping cycles, the connection between said pistons and said revoluble members causing the pistons to oscillate while reciprocating, said oscillatory movement of the pistons causing the pairs of ports therein to alternately register with the ports of the metering cylinders after the end of each piston stroke whereby to admit fluid to one end of each metering cylinder and to permit the fluid at the opposite end of each metering cylinder to be displaced during each piston stroke, indicating means operated by the pistons to indicate the volume of fluid displaced by the pistons.

9. A meter comprising a casing having an intake chamber and a discharge chamber, a pair of metering cylinders, a piston in each metering cylinder, each cylinder being formed with an intake and a discharge port, each piston having two pairs of ports, each pair comprising an intake and a discharge port adapted to register with the ports of the metering cylinder in which the piston is disposed, said pistons being adapted to be reciprocated by fluid from the intake chamber, a revoluble member for each piston revolving about an axis arranged at right angles to the axis of the pistons, a connection between each piston and the adjacent revoluble member at an eccentric point on the latter whereby reciprocation of the pistons will revolve said revoluble members, the connection between the pistons and the revoluble members being relatively disposed ninety degrees apart whereby the pistons will operate in overlapping cycles, the connection between said pistons and said revoluble members causing the pistons to oscillate while reciprocating, said oscillatory movement of the pistons causing the pairs of ports therein to alternately register with the ports of the metering cylinders after the end of each piston stroke whereby to admit fluid to one end of each metering cylinder and to permit the fluid at the opposite end of each metering cylinder to be displaced during each piston stroke, means operatively connecting said revoluble members whereby the pistons will operate in synchronism and in overlapping cycles, and indicating means driven by said revoluble members to indicate the volume of fluid displaced by the pistons.

10. A liquid meter comprising a casing having an intake chamber and a discharge chamber, a pair of metering cylinders, a piston in each metering cylinder, each cylinder being formed with an intake and a discharge port, each piston having two pairs of ports, each pair comprising an intake and a discharge port adapted to register with the ports of the metering cylinder in which the piston is disposed, said pistons being adapted to be reciprocated by fluid from the intake chamber, a revoluble member for each piston revolving about an axis arranged at right angles to the axis of the pistons, a connection between each piston and the adjacent revoluble member at an eccentric point on the latter whereby reciprocation of the pistons will revolve said revoluble members, the connection between the pistons and the revoluble members being relatively disposed ninety degrees apart whereby the pistons will operate in overlapping cycles, the connection between said pistons and said revoluble members causing the pistons to oscillate while reciprocating, said oscillatory movement of the pistons causing the pairs of ports therein to alternately register with the ports of the metering cylinders after the end of each piston stroke whereby to admit fluid to one end of each metering cylinder and to permit the fluid at the opposite end of each metring cylinder to be displaced during each piston stroke, means operatively connecting said revoluble members whereby the pistons will operate in synchronism and in overlapping cycles, indicating means driven by said revoluble members to indicate the volume of fluid displaced by the pistons, means for varying the combined displacement of said pistons and produce accurate agreement between the volume displaced and the indicating means.

11. A liquid meter comprising a casing having an intake chamber and a discharge chamber, a pair of metering cylinders, a piston in each metering cylinder, each cylinder being formed with an intake and a discharge port, each piston having two pairs of ports, each pair comprising an intake and a discharge port adapted to register with the ports of the metering cylinder in which the piston is disposed, said pistons being adapted to be reciprocated by fluid from the intake chamber, a revoluble member for each piston revolving about an axis arranged at right angles to the axis of the pistons, a connection between each piston and the adjacent revoluble member at an eccentric point on the latter whereby reciprocation of the pistons will revolve said revoluble members, the connection between the pistons and the revoluble members being relatively disposed ninety degrees apart whereby the pistons will operate in overlapping cycles, the connection between said pistons and said revoluble members causing the pistons to oscillate while reciprocating, said oscillatory movement of the pistons causing the pairs of ports therein to alternately register with the ports of the metering cylinders after the end of each piston stroke whereby to admit fluid to one end of each metering cylinder and to permit the fluid at the opposite end of each metering cylinder to be displaced during each piston stroke, means operatively connecting said revoluble members whereby the pistons will operate in synchronism and in overlapping cycles, indicating means driven by said revoluble members to indicate the volume of fluid displaced by the pistons, means for separately varying the strokes of said pistons to vary the combined displacement of the pistons and produce accurate agreement between the volume displaced and the indicating means.

12. A meter comprising a pair of metering cylinders, a reciprocable oscillatory piston mounted in each cylinder and adapted to be reciprocated by fluid delivered to the metering cylinders, the latter being provided with intake and discharge ports, each piston being formed with intake and discharge ports to cooperate with the ports of the metering cylinder in which the piston is disposed, crank means adapted to oscillate the pistons during the reciprocation thereof, said oscillation of the pistons controlling the registration of said ports whereby to admit fluid to one end of the metering cylinders and to permit the fluid at the opposite end of the cylinders to be displaced by the pistons during each stroke thereof, means operatively connecting the crank means of the pistons together whereby the pistons will operate in synchronism and in overlapping cycles, the combined effective area of the registering intake ports of both pistons and cylinders remaining constant throughout the operation of the metering, and indicating means driven by the crank means to indicate the fluid displaced by the pistons.

13. A meter comprising a pair of metering cylinders, a reciprocable oscillatory piston mounted in each cylinder and adapted to be reciprocated by fluid delivered to the metering cylinders, the latter being provided with intake and discharge ports, each piston being formed with intake and discharge ports to cooperate with the ports of the metering cylinder in which the piston is disposed, crank means adapted to oscillate the pistons during the reciprocation thereof, said oscillation of the pistons controlling the registration of said ports whereby to admit fluid to one end of the metering cylinders and to permit the fluid at the opposite end of the cylinders to be displaced by the pistons during each stroke thereof, means operatively connecting the crank means of the pistons together whereby the pistons will operate in synchronism and in overlapping cycles, the combined effective area of the registering intake and discharge ports of both pistons and cylinders remaining constant throughout the entire cycle of operation of the meter, and indicating means driven by the crank means to indicate the fluid displaced by the pistons.

ALBERT J. GRANBERG.